(12) United States Patent
Park et al.

(10) Patent No.: US 9,890,834 B2
(45) Date of Patent: *Feb. 13, 2018

(54) PLANETARY GEAR TRAIN OF AUTOMATIC TRANSMISSION FOR VEHICLES

(71) Applicant: Hyundai Motor Company, Seoul (KR)

(72) Inventors: Jong Sool Park, Hwaseong-si (KR); Sueng Ho Lee, Seoul (KR); Dong Hwan Hwang, Seoul (KR); Seong Wook Hwang, Gunpo-si (KR); Seongwook Ji, Gunpo-si (KR); Wonmin Cho, Hwaseong-si (KR); Hyun Sik Kwon, Seoul (KR); Kyeong Hun Lee, Seoul (KR); Jong Soo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/228,633

(22) Filed: Aug. 4, 2016

(65) Prior Publication Data

US 2017/0159768 A1  Jun. 8, 2017

(30) Foreign Application Priority Data

Dec. 2, 2015 (KR) .................. 10-2015-0170997

(51) Int. Cl.
 *F16H 3/66* (2006.01)
(52) U.S. Cl.
 CPC ....... *F16H 3/66* (2013.01); *F16H 2200/0065* (2013.01); *F16H 2200/2012* (2013.01); *F16H 2200/2046* (2013.01); *F16H 2200/2097* (2013.01)

(58) Field of Classification Search
 CPC .............. F16H 3/66; F16H 2200/065; F16H 2200/2097; F16H 2200/2046; F16H 2200/2012
 USPC ......................... 475/275–291, 330
 See application file for complete search history.

(56) References Cited

U.S. PATENT DOCUMENTS

2015/0087472 A1  3/2015 Beck et al.
2016/0356358 A1* 12/2016 Lee .................... F16H 3/66

FOREIGN PATENT DOCUMENTS

JP          2013-199958 A    10/2013

* cited by examiner

*Primary Examiner* — Roger L Pang
(74) *Attorney, Agent, or Firm* — Morgan, Lewis & Bockius LLP

(57) ABSTRACT

A planetary gear train of an automatic transmission for vehicle may include an input shaft receiving power of an engine, an output shaft outputting shifted power of the engine, a first planetary gear set including a first rotation element, a second rotation element, and a third rotation element, a second planetary gear set including a fourth rotation element, a fifth rotation element, and a sixth rotation element, a third planetary gear set including a seventh rotation element, an eighth rotation element, and a ninth rotation element, a fourth planetary gear set including a tenth rotation element, an eleventh rotation element, and a twelfth rotation element, and six control elements disposed at positions selectively connecting the rotation elements to each other or at positions selectively connecting the rotation elements and a transmission housing.

10 Claims, 2 Drawing Sheets

FIG. 2

| Speed stage | Control element | | | | | | Gear ratio | Ratio between gear shift stages | Span of a gear ratio |
| --- | --- | --- | --- | --- | --- | --- | --- | --- | --- |
|  | C1 | C2 | C3 | C4 | B1 | B2 |  |  |  |
| D1 |  |  | ● | ● |  | ● | 5.532 | - | 9.0 (Tuning avialable) |
| D2 |  | ● | ● |  |  | ● | 3.302 | 1.675 | |
| D3 |  | ● |  | ● |  | ● | 2.241 | 1.473 | |
| D4 | ● | ● |  |  |  | ● | 1.617 | 1.386 | |
| D5 | ● | ● |  | ● |  |  | 1.210 | 1.336 | |
| D6 | ● | ● | ● |  |  |  | 1.000 | 1.210 | |
| D7 | ● |  | ● | ● |  |  | 0.871 | 1.148 | |
| D8 | ● |  | ● |  | ● |  | 0.732 | 1.190 | |
| D9 | ● |  |  | ● | ● |  | 0.616 | 1.188 | |
| REV |  |  |  | ● | ● | ● | -4.705 | - | - |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2015-0170997, filed Dec. 2, 2015, the entire contents of which is incorporated herein for all purposes by this reference.

BACKGROUND OF THE INVENTION

Field of the Invention

The present invention relates to an automatic transmission for a vehicle. More particularly, the present invention relates to an automatic transmission for a vehicle that improves power delivery performance and fuel consumption and obtains a linearity between step ratios of transmission steps by enlarging a span of gear ratios while achieving nine forward speed stages using a minimum number of constituent elements.

Description of Related Art

Recent increases in oil prices are triggering stiff competition in enhancing fuel consumption of a vehicle.

Accordingly, research is being conducted on engines in terms of reducing weight and improving fuel efficiency by down-sizing, and research is also being conducted to ensure both drivability and competitiveness by maximizing fuel efficiency by implementing an automatic transmission with multiple speed-stages.

However, in order to achieve more shift stages for an automatic transmission, the number of parts is typically increased, which may deteriorate installability and/or power flow efficiency and may increase production cost, and weight.

Therefore, in order to increase an effect of improving fuel efficiency by implementing an automatic transmission with multiple speed-stages, it is important to develop a planetary gear train capable of maximizing efficiency using a small number of components.

In this respect, recently, an eight-speed automatic transmission has been implemented, and research and developments is being actively conducted on a planetary gear train that may implement gear shift stages for eight or more speeds.

However, in the case of the recent eight-speed automatic transmission, a span of a gear shift ratio is maintained at a level of 6.5 to 7.5, and as a result, there is a problem in that the recent eight-speed automatic transmission has no great effect of improving fuel efficiency.

In a case in which a span of a gear shift ratio in the eight-speed automatic transmission is increased to the level of 9.0 or more, because it is impossible to ensure linearity of step ratios between gear shift stages, driving efficiency of the engine and drivability of the vehicle deteriorate.

Accordingly, there is a need for development of a highly efficient automatic transmission with 9 or more forward speed stages.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle that improves power delivery performance and fuel efficiency and ensures linearity of step ratios between transmission steps by increasing a span of gear ratios while realizing at least nine forward speed stages and at least one reverse speed stage by using a minimum number of constituent elements.

According to various aspects of the present invention, a planetary gear train of an automatic transmission for vehicles may include an input shaft receiving power of an engine, an output shaft outputting shifted power of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, and six control elements disposed at positions selectively connecting the rotation elements to each other or at positions selectively connecting the rotation elements and a transmission housing, in which the input shaft may be continuously connected to the first rotation element, the output shaft may be continuously connected to the twelfth rotation element, the fourth rotation element may be continuously connected to the transmission housing, the sixth rotation element may be continuously connected to the tenth rotation element, the eighth rotation element may be continuously connected to the twelfth rotation element, the ninth rotation element may be continuously connected to the eleventh rotation element, and the second rotation element may be selectively connectable to the transmission housing.

The seventh rotation element may be selectively connectable to the transmission housing, the ninth rotation element may be selectively connectable to the input shaft, the second rotation element may be selectively connectable to the input shaft, the sixth rotation element may be selectively connectable to the second rotation element, and the third rotation element may be selectively connectable to the fifth rotation element.

The first, second, and third rotation elements may be a sun gear, a planet carrier, and a ring gear, the fourth, fifth, and sixth rotation elements may be a sun gear, a planet carrier, and a ring gear, the seventh, eighth, and ninth rotation elements may be a sun gear, a planet carrier, and a ring gear, and the tenth, eleventh, and twelfth rotation elements may be a sun gear, a planet carrier, and a ring gear.

According to various aspects of the present invention, a planetary gear train of an automatic transmission for vehicles may include an input shaft receiving power of an engine, an output shaft outputting shifted power of the engine, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, six control elements disposed at positions selectively connecting the rotation elements to each other or at positions selectively connecting the rotation elements and a transmission housing, a first rotation shaft including the first rotation element and directly connected to the input shaft, a second rotation shaft including the second rotation element and selectively connectable to the input shaft or the transmission housing, a third rotation shaft including the third rotation element, a fourth rotation shaft including the fourth rotation element and directly connected with the transmission housing, a fifth rotation shaft including the fifth rotation element and selectively connectable to the third rotation shaft, a sixth rotation shaft including the sixth rotation element and the tenth rotation element, and selectively connectable to the second rotation shaft, a seventh rotation shaft including the seventh rotation element, and selectively connectable to the transmission housing, an eighth rotation shaft including the eighth rotation element and twelfth rotation element, and directly connected to the output shaft, and a ninth rotation shaft including the ninth rotation element and the eleventh rotation element, and selectively connectable to the input shaft.

The first planetary gear set may be a single-pinion planetary gear set, in which the first rotation element may be a first sun gear, the second rotation element may be a first planet carrier, and the third rotation element may be a first ring gear, the second planetary gear set may be a single-pinion planetary gear set, in which the fourth rotation element may be a second sun gear, the fifth rotation element may be a second planet carrier, and the sixth rotation element may be a second ring gear, the third planetary gear set may be a single-pinion planetary gear set, in which the seventh rotation element may be a third sun gear, the eighth rotation element may be a third planet carrier, and the ninth rotation element may be a third ring gear, and the fourth planetary gear set may be a single-pinion planetary gear set, the tenth rotation element may be a fourth sun gear, the eleventh rotation element may be a fourth planet carrier, and the twelfth rotation element may be a fourth ring gear.

The six control elements may include a first clutch selectively connecting the input shaft and the ninth rotation shaft, a second clutch selectively connecting the input shaft and the second rotation shaft, a third clutch selectively connecting the second rotation shaft and the sixth rotation shaft, a fourth clutch selectively connecting the third rotation shaft and the fifth rotation shaft, a first brake selectively connecting the second rotation shaft and the transmission housing, and a second brake selectively connecting the seventh rotation shaft and the transmission housing.

Speed stages realized by selective operation of the six control elements may include a first forward speed stage achieved by operation of the third and fourth clutches and the second brake, a second forward speed stage achieved by operation of the second and third clutches and the second brake, a third forward speed stage achieved by operation of the second and fourth clutches and the second brake, a fourth forward speed stage achieved by operation of the first and second clutches and the second brake, a fifth forward speed stage achieved by operation of the first, second, and fourth clutches, a sixth forward speed stage achieved by operation of the first, second, and third clutches, a seventh forward speed stage achieved by operation of the first, third, and fourth clutches, an eighth forward speed stage achieved by operation of the first and third clutches and the first brake, a ninth forward speed stage achieved by operation of the first and fourth clutches and the first brake, and a reverse speed stage achieved by operation of the fourth clutch and the first and second brakes.

According to various aspects of the present invention, a planetary gear train of an automatic transmission for vehicles may include an input shaft receiving power of an engine, an output shaft outputting shifted power of the engine, a first planetary gear set being a single pinion planetary gear set and including first, second, and third rotation elements, a second planetary gear set being a single pinion planetary gear set and including fourth, fifth, and sixth rotation elements, a third planetary gear set being a single pinion planetary gear set and including seventh, eighth, and ninth rotation element, and a fourth planetary gear set being a single pinion planetary gear set and including tenth, eleventh, and twelfth rotation elements, a first rotation shaft including the first rotation element and directly connected to the input shaft, a second rotation shaft including the second rotation element and selectively connectable to at least one of the input shaft and a transmission housing, a third rotation shaft including the third rotation element, a fourth rotation shaft including the fourth rotation element and directly connected with the transmission housing, a fifth rotation shaft including the fifth rotation element and selectively connectable to the third rotation shaft, a sixth rotation shaft including the sixth rotation element and the tenth rotation element, and selectively connectable to the second rotation shaft, a seventh rotation shaft including the seventh rotation element, and selectively connectable to the transmission housing, an eighth rotation shaft including the eighth rotation element and twelfth rotation element, and directly connected to the output shaft, a ninth rotation shaft including the ninth rotation element and the eleventh rotation element, and selectively connectable to the input shaft, a first clutch selectively connecting the input shaft and the ninth rotation shaft, a second clutch selectively connecting the input shaft and the second rotation shaft, a third clutch selectively connecting the second rotation shaft and the sixth rotation shaft, a fourth clutch selectively connecting the third rotation shaft and the fifth rotation shaft, a first brake selectively connecting the second rotation shaft and the transmission housing, and a second brake selectively connecting the seventh rotation shaft and the transmission housing.

The first planetary gear set may include the first rotation element being a first sun gear, the second rotation element being a first planet carrier, and the third rotation element being a first ring gear, the second planetary gear set may include the fourth rotation element being a second sun gear, the fifth rotation element being a second planet carrier, and the sixth rotation element being a second ring gear, the third planetary gear set may include the seventh rotation element being a third sun gear, the eighth rotation element being a third planet carrier, and the ninth rotation element being a third ring gear, and the fourth planetary gear set may include the tenth rotation element being a fourth sun gear, the eleventh rotation element being a fourth planet carrier, and the twelfth rotation element being a fourth ring gear.

The planetary gear train according to various embodiments of the present invention implements the gear shift stages for nine forward speed stages and one reverse speed stage by combining four planetary gear sets with the six control elements.

In addition, a span of a gear shift ratio is 9.0 or more, thereby maximizing driving efficiency of the engine.

Furthermore, the linearity of the interstage ratio of the shift stage is secured while multi-staging the shift stages at high efficiency, thereby making it possible to improve drivability such as acceleration before and after the shift, an engine speed rhythmic sense, and the like.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective control elements applied to the planetary gear train according to various embodiments of the present invention.

Figure 1:
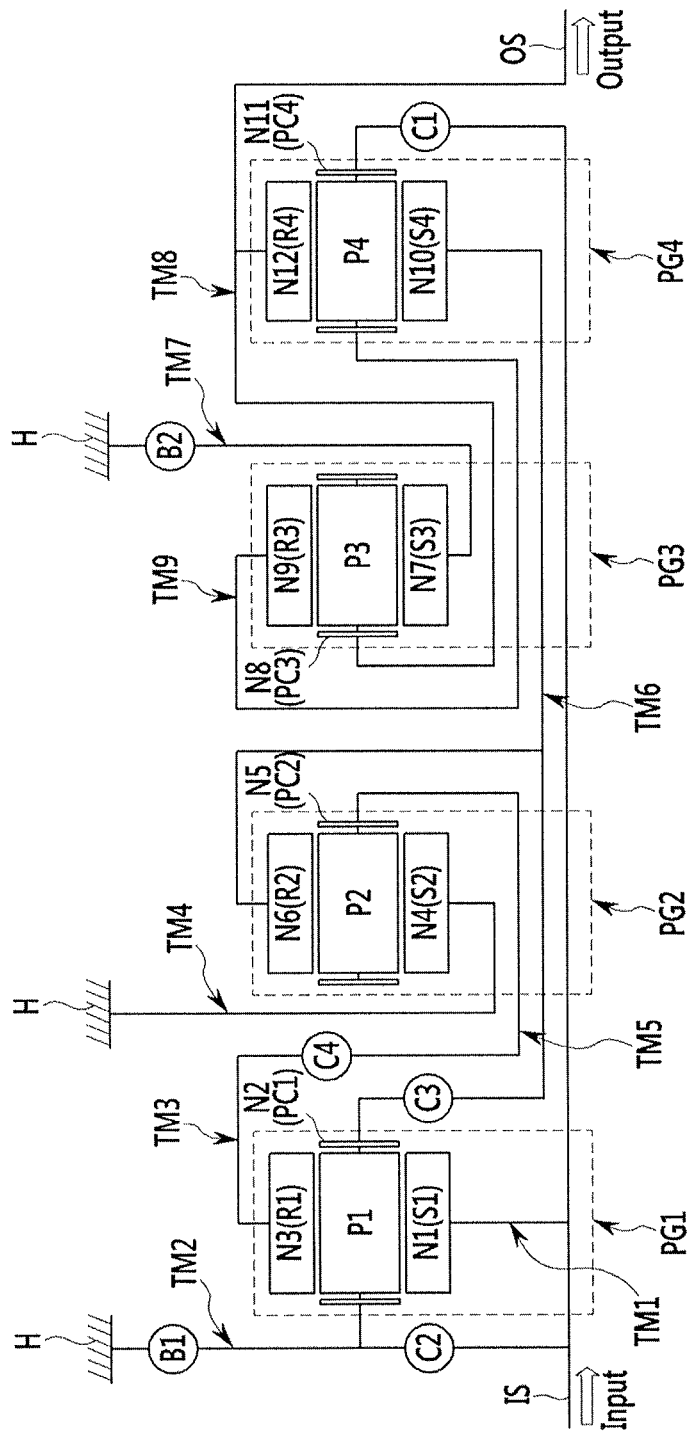
FIG. 1 is a configuration diagram of a planetary gear train according to various embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a planetary gear train according to various embodiments of the present invention.

Referring to FIG. 1, the planetary gear train according to various embodiments of the present invention includes first, second, third, and fourth planetary gear sets PG1, PG2, PG3, and PG4 disposed on the same axis, an input shaft IS, an output shaft OS, eight rotation shafts TM1 to TM8 directly connecting to each other through respective rotation elements of the first, second, third, and fourth planetary gear sets PG1, PG2, PG3, and PG4, six control elements C1-C3 and B1-B3, and a transmission housing H.

As a result, torque input from the input shaft IS is transmitted by an inter-complementation operation of the first, second, third, and fourth planetary gear sets PG1, PG2, PG3, and PG4 to be output through the output shaft OS.

The respective simple planetary gear sets are disposed in a sequence of the first, second, third, and fourth planetary gear sets PG1, PG2, PG3, and PG4 from an engine side.

The input shaft IS is an input member, and rotational power from a crankshaft of an engine is torque-converted through a torque converter to be input into the input shaft IS.

The output shaft OS is an output member, is disposed on the same axis as the input shaft IS, and transfers transmitted driving torque to a driving shaft through a differential apparatus.

The first planetary gear set PG1 is a single pinion planetary gear set, and includes rotation elements including a first sun gear S1 which is a first rotation element N1, a first planet carrier PC1 which is a second rotation element N2 for supporting a first pinion P1 that externally engages with the first sun gear S1 that is the first rotation element N1, and a first ring gear R1 which is a third rotation element N3 that internally engages with the first pinion P1.

The second planetary gear set PG2 is a single pinion planetary gear set, and includes a second sun gear S2 which is a fourth rotation element N4, a second planet carrier PC2 which is a fifth rotation element N5 for supporting a second pinion P2 that externally engages with the second sun gear S2 that is the fourth rotation element N4, and a second ring gear R2 which is a sixth rotation element N6 that internally engages with the second pinion P2.

The third planetary gear set PG3 is a single pinion planetary gear set, and includes a third sun gear S3 which is a seventh rotation element N7, a third planet carrier PC3 which is an eighth rotation element N8 for supporting a third pinion P3 that externally engages with the third sun gear S3 that is the seventh rotation element N7, and a third ring gear R3 which is a ninth rotation element N9 that internally engages with the third pinion P3.

The fourth planetary gear set PG4 is a single pinion planetary gear set and includes a fourth sun gear S4 which is a tenth rotation element N10, a fourth planet carrier PC4 which is an eleventh rotation element N11 for supporting a fourth pinion P4 that externally engages with the fourth sun gear S4 that is the tenth rotation element N10, and a fourth ring gear R4 which is a twelfth rotation element N12 that internally engages with the fourth pinion P4.

The first, second, third, and fourth planetary gear sets PG1, PG2, PG3, and PG4 are operated while retaining the total of nine rotation shafts TM1 to TM9 in a state in which the sixth rotation element N6 is directly connected to the tenth rotation element N10, the eighth rotation element N8 is directly connected to the twelfth rotation element N12, and the ninth rotation element N9 is directly connected to the eleventh rotation element N11.

The configurations of the nine rotation shafts TM1 to TM9 will be described below.

The first rotation shaft TM1 includes the first rotation element N1 (the first sun gear S1) and is directly connected with the input shaft IS so as to be continuously operated as an input element.

The second rotation shaft TM2 includes a second rotation element N2 (the first planet carrier PC1) and is selectively connectable with the input shaft IS (the first rotation shaft TM1), and is selectively connectable to the transmission housing H so as to be selectively operated as an input element or a fixing element.

The third rotation shaft TM3 includes a third rotation element N3 (a first ring gear R1).

The fourth rotation shaft TM4 includes a fourth rotation element N4 (a second sun gear S2), and is directly connected to the transmission housing H so as to be operated as a fixing element.

The fifth rotation shaft TM5 includes a fifth rotation element N5 (the second planet carrier PC2), and is selectively connectable to the third rotation shaft TM3.

The sixth rotation shaft TM6 includes a sixth rotation element N6 (the second ring gear R2) and tenth rotation element N10 (the fourth sun gear S4), and is selectively connectable to the second rotation shaft TM2.

The seventh rotation shaft TM7 includes the seventh rotation element N7 (the third sun gear S3), and is selectively connectable to the transmission housing H so to be operated as a fixing element.

The eighth rotation shaft TM8 includes the eighth rotation element N8 (the third planet carrier PC3) and the twelfth rotation element N12 (the fourth ring gear R4), and is directly connected to the output shaft OS so as to be operated as an output element.

The ninth rotation shaft TM9 includes the ninth rotation element N9 (a third ring gear R3) and eleventh rotation element N11 (the fourth planet carrier PC4), and is selectively connectable to the input shaft IS (the first rotation shaft TM1) so as to be operated as a selective input element.

Further, four clutches C1, C2, C3, and C4, which are control elements, are disposed at positions where rotation shafts of the rotation shafts TM1 to TM9 are selectively connectable to each other.

In addition, two brakes B1 and B2, which are control elements, are disposed at positions where the rotation shafts of the rotation shafts TM1 to TM9 are selectively connectable with the transmission housing H.

The arrangement positions of the six control elements C1-C4 and B1-B2 will be described below.

The first clutch C1 is disposed between the input shaft IS and the ninth rotation shaft TM9 to selectively integrate the input shaft IS and the ninth rotation shaft TM9.

The second clutch C2 is disposed between the input shaft IS and the second rotation shaft TM2 to selectively integrate the input shaft IS and the second rotation shaft TM2.

The third clutch C3 is interposed between the second rotation shaft TM2 and the sixth rotation shaft TM6 to selectively integrate the second rotation shaft TM2 and the sixth rotation shaft TM6.

The fourth clutch C4 is interposed between the third rotation shaft TM3 and the fifth rotation shaft TM5 to selectively integrate the third rotation shaft TM3 and fifth rotation shaft TM5.

The first brake B1 is interposed between the second rotation shaft TM2 and the transmission housing H to selectively operate second rotation shaft TM2 as a fixing element.

The second brake B2 is interposed between the seventh rotation shaft TM7 and the transmission housing H to selectively operate the seventh rotation shaft TM7 as a fixing element.

The respective control elements including the first, second, third, and fourth clutches C1, C2, C3, and C4, and the first and second brakes B1 and B2 may be formed of a multi-plate type hydraulic friction coupling unit which is frictionally coupled by hydraulic pressure.

FIG. 2 is an operation table for each of transmission steps of respective control elements applied to the planetary gear train according to various embodiments of the present invention.

As shown in FIG. 2, the planetary gear train according to various embodiments of the present invention is shifted while three control elements are operated in each shift stage.

At the first forward speed stage D1, the third and fourth clutches C3 and C4 and the second brake B2 are operated. Therefore, in a state in which the second rotation shaft TM2 is connected to the sixth rotation shaft TM6 to each other by the operation of the third clutch C3 and the third rotation shaft TM3 is connected to the fifth rotation shaft TM5 by the operation of the fourth clutch C4, the power is input to the first rotation shaft TM1.

While the fourth rotation shaft TM4 is continuously operated as a fixing element and the seventh rotation shaft TM7 is operated as a fixing element by the operation of the second brake B2, the first forward speed is realized and the power is output through the output shaft OS including the eighth rotation shaft TM8 by an inter-complementation operation of each rotation shaft.

At the second forward speed stage D2, the second and the third clutch C2 and C3, and the second brake B2 are operated. Therefore, in a state in which the input shaft IS is connected to the second rotation shaft TM2 by the operation of second clutch C2 and the second rotation shaft TM2 is connected to the sixth rotation shaft TM6 to each other by the operation of the third clutch C3, the power of the input shaft IS is input to the first rotation shaft TM1 and the second rotation shaft TM2. While the fourth rotation shaft TM4 is operated as a fixing element and the seventh rotation shaft TM7 is operated as a fixing element by the operation of the second brake B2, the second forward speed is realized and the power is output through the output shaft OS including the eighth rotation shaft TM8.

At the third forward speed stage D3, the second and fourth clutches C2 and C4 and the second brake B2 are operated. Therefore, in a state in which the input shaft IS is connected to the second rotation shaft TM2 to each other by the operation of the second clutch C2 and the third rotation shaft TM3 is connected to the fifth rotation shaft TM5 to each other by the operation of the second clutch C2, the power of the input shaft IS is input to the first rotation shaft TM1 and the second rotation shaft TM2. In addition, while the fourth rotation shaft TM4 is continuously operated as a fixing element and the seventh rotation shaft TM7 is operated as a fixing element by the operation of the second brake B2, the third forward speed is realized and the power is output through the output shaft OS including the eighth rotation shaft TM8.

At the fourth forward speed stage D4, the first and second clutches C1 and C2 and the second brake B2 are operated. Therefore, in a stage in which the input shaft IS connected to the ninth rotation shaft TM9 to each other by the operation of the first clutch C1 and the input shaft IS is connected to the second rotation shaft TM2 to each other by the operation of the second clutch C2, the power of the input shaft IS is input to the first rotation shaft TM1 and second rotation shaft TM2, and ninth rotation shaft TM9. In addition, while the fourth rotation shaft TM4 is operated as a fixing element and the seventh rotation shaft TM7 is operated as a fixing element by the operation of the second brake B2, the fourth forward speed is realized and the power is output through the output shaft OS including the eighth rotation shaft TM8.

At the fifth forward speed stage D5, the first, second, and fourth clutches C1, C2, and C4 are operated. Therefore, in a state in which the input shaft IS is connected to the ninth rotation shaft TM9 to each other by the operation of the first clutch C1, the input shaft IS is connected to the second rotation shaft TM2 to each other by the operation of the second clutch C2, and the third rotation shaft TM3 is connected to the fifth rotation shaft TM5 to each other by the operation of the fourth clutch C4, the power of the input shaft IS is input to the first rotation shaft TM1 and second rotation shaft TM2, and the ninth rotation shaft TM9. In addition, while the fourth rotation shaft TM4 is operated as a fixing element, the fifth forward speed is realized and the power is output through the output shaft OS including the eighth rotation shaft TM8.

At the sixth forward speed stage D6, the first, second, and third clutches C1, C2, and C3 are operated. Therefore, in a state in which the input shaft IS is connected to the ninth rotation shaft TM9 to each other by the operation of the first clutch C1, the input shaft IS is connected to the second rotation shaft TM2 to each other by the operation of the second clutch C2, and the second rotation shaft TM2 is connected to the sixth rotation shaft TM6 to each other by the operation of the third clutch C3, the power of the input shaft IS is input to the first rotation shaft TM1 and second rotation shaft TM2, and the ninth rotation shaft TM9. In addition, while the fourth rotation shaft TM4 is operated as a fixing element and the first, third, and fourth planetary gear set PG1, PG3, and PG4 are directly connected each other, the sixth forward speed, in which the input power is output as it is, is realized and the power is output through the output shaft OS including the eighth rotation shaft TM8.

At the seventh forward speed stage D7, the first, third, and fourth clutches C1, C3, and C4 are operated. Therefore, in a state in which the input shaft IS is connected to the ninth rotation shaft TM9 to each other by the operation of the first clutch C1, the second rotation shaft TM2 connected to the sixth rotation shaft TM6 to each other by the operation of the third clutch C3, and the third rotation shaft TM3 is connected to the fifth rotation shaft TM5 to each other by the operation of the fourth clutch C4, the power of the input shaft IS is input to the first rotation shaft TM1 and the ninth rotation shaft TM9. In addition, while the fourth rotation shaft TM4 is operated as a fixing element, the seventh forward speed is realized and the power is output through the output shaft OS including the eighth rotation shaft TM8.

At the eighth forward speed stage D8, the first and third clutches C1 and C3, and the first brake B1 are operated. Therefore, in a state in which the input shaft IS is connected to the ninth rotation shaft TM9 to each other by the operation of the first clutch C1 and the second rotation shaft TM2 is connected to the sixth rotation shaft TM6 to each other by the operation of the third clutch C3, the power of the input shaft IS is input to the first rotation shaft TM1. In addition, while the fourth rotation shaft TM4 is operated as a fixing element and the second rotation shaft TM2 is operated as a fixing element by the operation of the first brake B1, the eighth forward speed is realized and the power is output through the output shaft OS including the eighth rotation shaft TM8.

At the ninth forward speed stage D9, the first and fourth clutches C1 and C4 and the first brake B1 are operated. Therefore, in a state in which the input shaft IS is connected to the ninth rotation shaft TM9 to each other by the operation of the first clutch C1 and the third rotation shaft TM3 is connected to the fifth rotation shaft TM5 to each other by the operation of the fourth clutch C4, the power of the input shaft IS is input to the first rotation shaft TM1. In addition, while fourth rotation shaft TM4 is operated as a fixing element and the second rotation shaft TM2 is operated as a fixing element by the operation of the first brake B1, the ninth forward speed is realized and the power is output through the output shaft OS including the eighth rotation shaft TM8.

At the reverse speed stage REV, the fourth clutch C4 and the first and second brakes B1 and B2 are operated. Therefore, in a state in which the third rotation shaft TM3 is connected to the fifth rotation shaft TM5 to each other by the operation of the fourth clutch C4, the power of the input shaft IS is input to the first rotation shaft TM1. In addition, while the fourth rotation shaft TM4 is operated as a fixing element and the second and seventh rotation shaft TM2 and TM7 are operated as a fixing element by the operation of the first brake B1 and the second brake B2, the reverse speed is realized and the power is output through the output shaft OS including the eighth rotation shaft TM8.

The planetary gear train according to various embodiments of the present invention implements the gear shift stages for nine forward speed stages and one reverse speed stage by operating and controlling the four planetary gear sets PG1, PG2, PG3, and PG4 using the four clutches C1, C2, C3, and C4 and the two brakes B1 and B2.

In addition, a span of a gear shift ratio is 9.0 or more, thereby maximizing driving efficiency of the engine.

Furthermore, the linearity of the interstage ratio of the shift stage is secured while multi-staging the shift stages at high efficiency, thereby making it possible to improve drivability such as acceleration before and after the shift, an engine speed rhythmic sense, and the like.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicle comprising:
   an input shaft receiving power of an engine;
   an output shaft outputting shifted power of the engine;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including a tenth rotation element, an eleventh rotation element, and a twelfth rotation element; and
   six control elements disposed at positions selectively connecting the rotation elements to each other or at positions selectively connecting the rotation elements and a transmission housing,
   wherein the input shaft is continuously connected to the first rotation element,
   the output shaft is continuously connected to the twelfth rotation element,
   the fourth rotation element is continuously connected to the transmission housing,
   the sixth rotation element is continuously connected to the tenth rotation element,
   the eighth rotation element is continuously connected to the twelfth rotation element,
   the ninth rotation element is continuously connected to the eleventh rotation element, and
   the second rotation element is selectively connectable to the transmission housing.

2. The planetary gear train of claim 1, wherein
   the seventh rotation element is selectively connectable to the transmission housing,
   the ninth rotation element is selectively connectable to the input shaft,
   the second rotation element is selectively connectable to the input shaft,
   the sixth rotation element is selectively connectable to the second rotation element, and the third rotation element is selectively connectable to the fifth rotation element.

3. The planetary gear train of claim 1, wherein
the first rotation element, the second rotation element, and the third rotation element comprise a sun gear, a planet carrier, and a ring gear;
the fourth rotation element, the fifth rotation element, and the sixth rotation element comprise a sun gear, a planet carrier, and a ring gear;
the seventh rotation element, the eighth rotation element, and the ninth rotation element comprise a sun gear, a planet carrier, and a ring gear; and
the tenth rotation element, the eleventh rotation element, and the twelfth rotation element comprise a sun gear, a planet carrier, and a ring gear.

4. A planetary gear train of an automatic transmission for vehicle comprising:
an input shaft receiving power of an engine;
an output shaft outputting shifted power of the engine;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element;
a fourth planetary gear set including a tenth rotation element, an eleventh rotation element, and a twelfth rotation element;
six control elements disposed at positions selectively connecting the rotation elements to each other or at positions selectively connecting the rotation elements and a transmission housing;
a first rotation shaft including the first rotation element and directly connected to the input shaft;
a second rotation shaft including the second rotation element and selectively connectable to the input shaft or the transmission housing;
a third rotation shaft including the third rotation element;
a fourth rotation shaft including the fourth rotation element and directly connected with the transmission housing;
a fifth rotation shaft including the fifth rotation element and selectively connectable to the third rotation shaft;
a sixth rotation shaft including the sixth rotation element and the tenth rotation element, and selectively connectable to the second rotation shaft;
a seventh rotation shaft including the seventh rotation element, and selectively connectable to the transmission housing;
an eighth rotation shaft including the eighth rotation element and twelfth rotation element, and directly connected to the output shaft; and
a ninth rotation shaft including the ninth rotation element and the eleventh rotation element, and selectively connectable to the input shaft.

5. The planetary gear train of claim 4, wherein
the first planetary gear set is a single-pinion planetary gear set, in which the first rotation element is a first sun gear, the second rotation element is a first planet carrier, and the third rotation element is a first ring gear;
the second planetary gear set is a single-pinion planetary gear set, in which the fourth rotation element is a second sun gear, the fifth rotation element is a second planet carrier, and the sixth rotation element is a second ring gear;
the third planetary gear set is a single-pinion planetary gear set, in which the seventh rotation element is a third sun gear, the eighth rotation element is a third planet carrier, and the ninth rotation element is a third ring gear; and
the fourth planetary gear set is a single-pinion planetary gear set, the tenth rotation element is a fourth sun gear, the eleventh rotation element is a fourth planet carrier, and the twelfth rotation element is a fourth ring gear.

6. The planetary gear train of claim 4, wherein the six control elements include:
a first clutch selectively connecting the input shaft and the ninth rotation shaft;
a second clutch selectively connecting the input shaft and the second rotation shaft;
a third clutch selectively connecting the second rotation shaft and the sixth rotation shaft;
a fourth clutch selectively connecting the third rotation shaft and the fifth rotation shaft;
a first brake selectively connecting the second rotation shaft and the transmission housing; and
a second brake selectively connecting the seventh rotation shaft and the transmission housing.

7. The planetary gear train of claim 6, wherein speed stages realized by selective operation of the six control elements include:
a first forward speed stage achieved by operation of the third and fourth clutches and the second brake;
a second forward speed stage achieved by operation of the second and third clutches and the second brake;
a third forward speed stage achieved by operation of the second and fourth clutches and the second brake;
a fourth forward speed stage achieved by operation of the first clutch and the second clutch and the second brake;
a fifth forward speed stage achieved by operation of the first, second, and fourth clutches;
a sixth forward speed stage achieved by operation of the first, second, and third clutches;
a seventh forward speed stage achieved by operation of the first, third, and fourth clutches;
an eighth forward speed stage achieved by operation of the first and third clutches and the first brake;
a ninth forward speed stage achieved by operation of the first and fourth clutches and the first brake; and
a reverse speed stage achieved by operation of the fourth clutch and the first and second brakes.

8. A planetary gear train of an automatic transmission for vehicle comprising:
an input shaft receiving power of an engine;
an output shaft outputting shifted power of the engine;
a first planetary gear set comprising a single pinion planetary gear set and including a first rotation element, a second rotation element, and a third rotation element;
a second planetary gear set comprising a single pinion planetary gear set and including a fourth rotation element, a fifth rotation element, and a sixth rotation element;
a third planetary gear set comprising a single pinion planetary gear set and including a seventh rotation element, an eighth rotation element, and a ninth rotation element;
a fourth planetary gear set comprising a single pinion planetary gear set and including a tenth rotation element, an eleventh rotation element, and a twelfth rotation element,
a first rotation shaft including the first rotation element and directly connected to the input shaft;

a second rotation shaft including the second rotation element and selectively connectable to at least one of the input shaft and a transmission housing;
a third rotation shaft including the third rotation element;
a fourth rotation shaft including the fourth rotation element and directly connected with the transmission housing;
a fifth rotation shaft including the fifth rotation element and selectively connectable to the third rotation shaft;
a sixth rotation shaft including the sixth rotation element and the tenth rotation element, and selectively connectable to the second rotation shaft;
a seventh rotation shaft including the seventh rotation element, and selectively connectable to the transmission housing;
an eighth rotation shaft including the eighth rotation element and twelfth rotation element, and directly connected to the output shaft;
a ninth rotation shaft including the ninth rotation element and the eleventh rotation element, and selectively connectable to the input shaft;
a first clutch selectively connecting the input shaft and the ninth rotation shaft;
a second clutch selectively connecting the input shaft and the second rotation shaft;
a third clutch selectively connecting the second rotation shaft and the sixth rotation shaft;
a fourth clutch selectively connecting the third rotation shaft and the fifth rotation shaft;
a first brake selectively connecting the second rotation shaft and the transmission housing; and
a second brake selectively connecting the seventh rotation shaft and the transmission housing.

9. The planetary gear train of claim 8, wherein
the first planetary gear set includes the first rotation element comprising a first sun gear, the second rotation element comprising a first planet carrier, and the third rotation element comprising a first ring gear;
the second planetary gear set includes the fourth rotation element comprising a second sun gear, the fifth rotation element comprising a second planet carrier, and the sixth rotation element comprising a second ring gear;
the third planetary gear set includes the seventh rotation element comprising a third sun gear, the eighth rotation element comprising a third planet carrier, and the ninth rotation element comprising a third ring gear; and
the fourth planetary gear set includes the tenth rotation element comprising a fourth sun gear, the eleventh rotation element comprising a fourth planet carrier, and the twelfth rotation element comprising a fourth ring gear.

10. The planetary gear train of claim 8, wherein speed stages realized by selective operation of four clutches having the first to fourth clutches and two brakes having the first and second brakes, include:
a first forward speed stage achieved by operation of the third and fourth clutches and the second brake;
a second forward speed stage achieved by operation of the second and third clutches and the second brake;
a third forward speed stage achieved by operation of the second and fourth clutches and the second brake;
a fourth forward speed stage achieved by operation of the first clutch and the second clutch and the second brake;
a fifth forward speed stage achieved by operation of the first, second, and fourth clutches;
a sixth forward speed stage achieved by operation of the first, second, and third clutches;
a seventh forward speed stage achieved by operation of the first, third, and fourth clutches;
an eighth forward speed stage achieved by operation of the first and third clutches and the first brake;
a ninth forward speed stage achieved by operation of the first and fourth clutches and the first brake; and
a reverse speed stage achieved by operation of the fourth clutch and the first and second brakes.

* * * * *